United States Patent Office 3,108,704
Patented Oct. 29, 1963

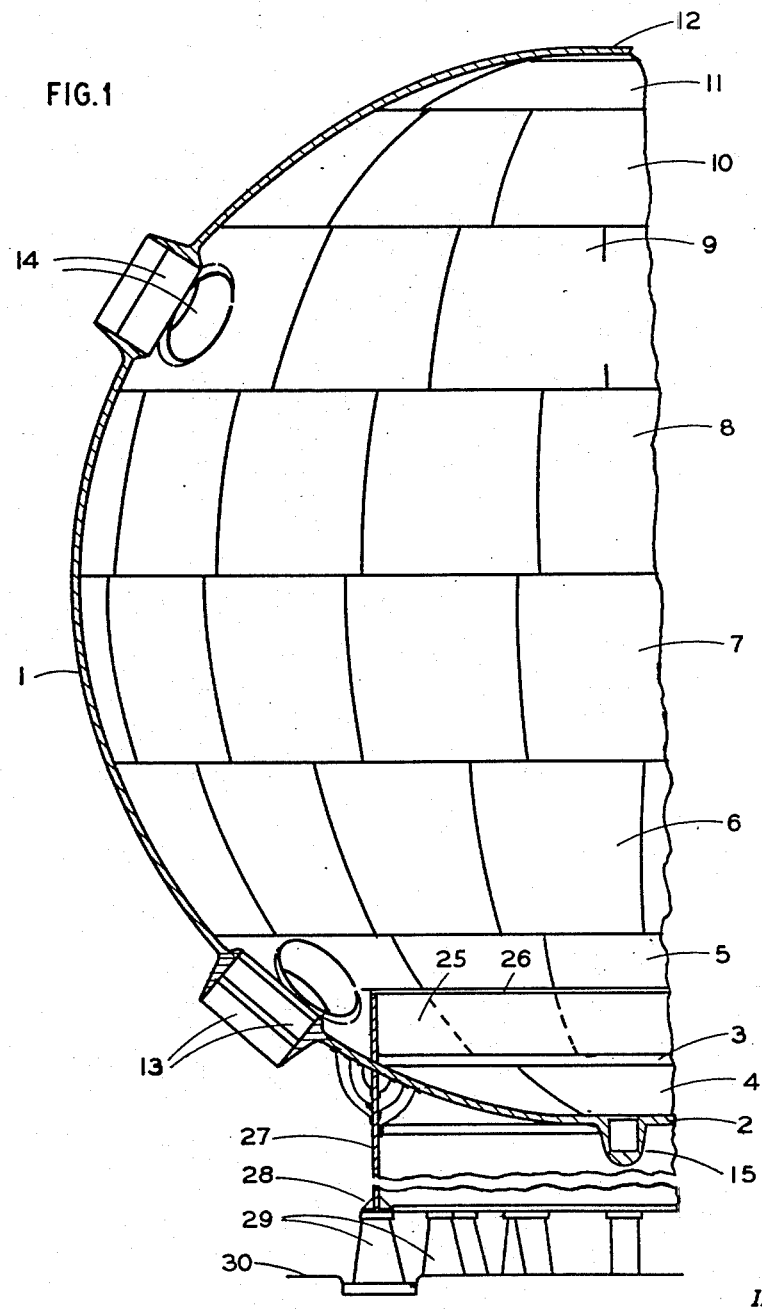

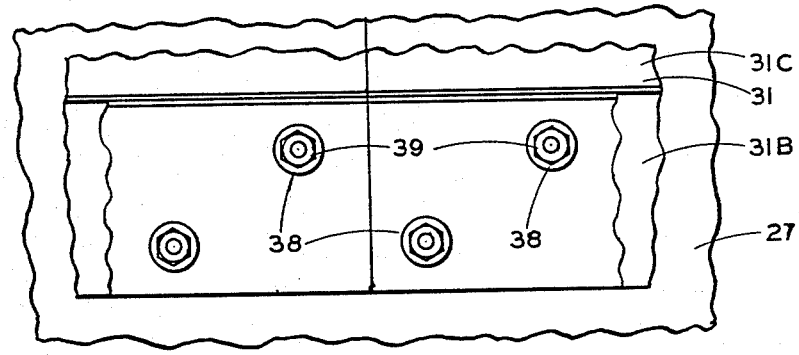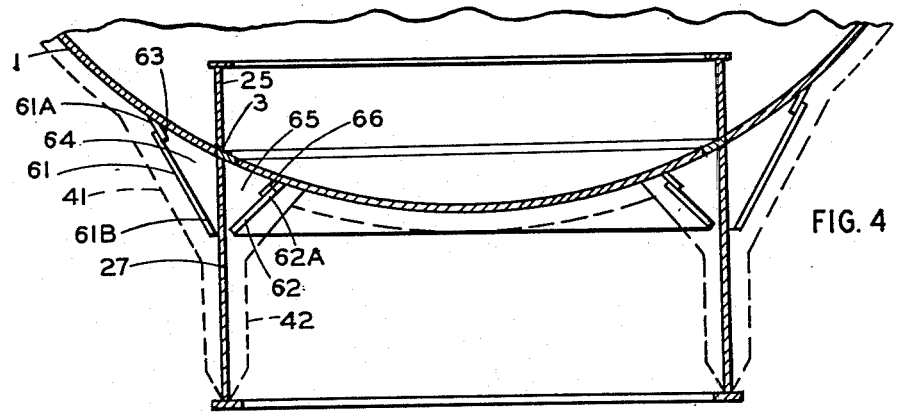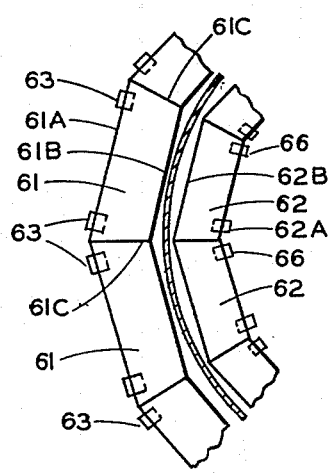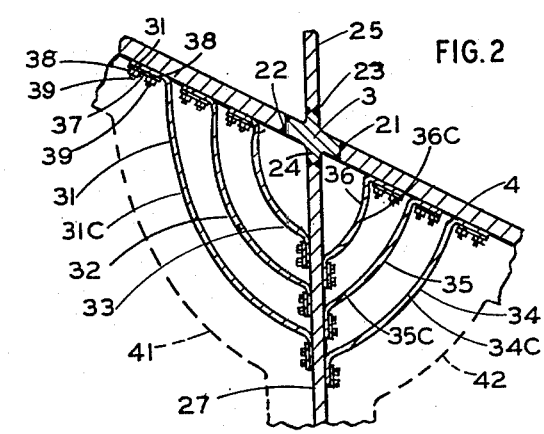

3,108,704
PRESSURE VESSEL
Norman George Worley, London, and Michael Rooney, Molesey, England, assignors to Babcock & Wilcox Limited, London, England, a British company
Filed June 24, 1959, Ser. No. 822,540
Claims priority, application Great Britain June 26, 1958
9 Claims. (Cl. 220—1)

This invention relates to pressure vessels of the kind adapted to operate at elevated temperature and supported from below by a skirt rigidly united with the pressure vessel. In such a pressure vessel the metal in the region of the joint between the support skirt and the pressure vessel is subjected during operation to relatively high and complicated stresses due in part to the different temperatures arising in the pressure vessel wall and in the skirt. An object of the invention is the provision of means whereby such stresses are reduced.

In a pressure vessel of the kind specified according to the present invention provision is made for maintaining through heat derived by the skirt from the pressure vessel, additional to that derived by conduction to the skirt through the joint between the skirt and the pressure vessel, a relatively low temperature gradient along a length of skirt extending from the said joint.

It will be appreciated that by maintaining a length of the skirt adjacent the joint at temperatures differing but little from the temperature at the joint, the skirt in the neighbourhood of the joint and the pressure vessel at the joint will expand or contract with changes of temperature to approximately equal degrees, with the result that stresses in the metal adjacent the joint due to different temperatures of the pressure vessel and the skirt are limited to relatively low values.

In one form of the invention a part of the pressure vessel adjacent the length of skirt is in radiant heat transfer relationship with the said length. While in another form of the invention means flanking the said length of skirt are arranged to conduct heat from the pressure vessel.

The invention will now be described by way of example with reference to the accompanying drawings, in which:

FIGURE 1 is a sectional elevation of part of a nuclear reactor pressure vessel including a spherical shell that is bottom supported by a skirt, FIGURE 2 is an enlarged view of part of FIGURE 1, showing the joint between the supporting skirt and the shell and adjacent parts, FIGURE 3 is a view of certain plate-securing means, FIGURE 4 is a sectional elevation of the lower part of a nuclear reactor pressure vessel, illustrating a modification of the arrangement of FIGURES 1 to 3, and FIGURE 5 is an upward view in section of part of the pressure vessel of FIGURE 4.

Referring to FIGURES 1 to 3 of the accompanying drawings, a pressure vessel designed to enclose the core of a gas-cooled graphite-moderated nuclear reactor comprises a spherical shell 1 formed generally from convex plates butt-welded at their edges. The lowermost plate 2 is circular and from it there extends upwardly and outwardly to a cruciform-second annulus 3 which will be subsequently described, a first course of ten petal-like plates 4. A second course of eighteen plates 5 extends upwardly and outwardly from the annulus 3 and the shell is completed by an upwardly and outwardly extending third course of eighteen plates 6, an upwardly and outwardly extending fourth course of eighteen plates 7, an upwardly and inwardly extending fifth course of eighteen plates 8, an upwardly and inwardly extending sixth course of twenty plates 9, and upwardly and inwardly extending seventh course of thirteen plates 10, an upwardly and inwardly extending eighth course of eight petal-like plates 11 and an uppermost plate 12 which is circular. At positions spaced around the pressure vessel at the level of the second course of plates the shell is pierced by gas inlets 13 and at positions spaced around the pressure vessel at the level of the sixth course of plates the shell is pierced by gas outlets 14; except for the modifications necessary to provide the apertures for these inlets and outlets and for many other nozzles and openings, not shown for the sake of clarity, providing for nuclear fuel element insertion and withdrawal, instrument insertion and withdrawal and the like, all the plates of each course have the same contour. Welded into the lowermost plate 2 is a debris removal nozzle 15.

The annulus 3, cruciform in section, provides four annular limbs, of which two limbs 21 and 22 enter into the spherical form of the shell while two vertical limbs 23 and 24 project respectively within the pressure vessel interior and outside the shell. The lower edge of the lower annular shell limb 21 of the annulus 3 is welded to the upper edges of the plates 4 of the first plate course and the upper edge of the upper annular shell limb 22 is welded to the lower edges of the plates 5 of the third plate course. The annulus 3 is formed of fifteen arcuate sections of equal lengths butt-welded end to end. Each arcuate section is formed by a hammer forging process or by pressing and bending.

The upper vertical annular limb 23 of the annulus 3 is butt-welded to the lower edge of a cylindrical support 25 within the pressure vessel interior. The support 25 is formed from twelve curved plates, bent from flat rectangular form and of equal lengths, welded together at their adjacent vertical edges. The support 25 is provided at its upper edge with a flange 26 on which is designed to rest a grid-like structure or diagrid on which the reactor core is mounted.

The lower vertical annular limb 24 of the annulus 3 is butt-welded to the upper edge of a cylindrical supporting skirt 27 curved to the same diameter as the interior support 25 and situated immediately therebelow outside the pressure vessel. The foot of the skirt 27 is welded to a polygonal base ring 28 which rests on a circular series of twelve piers 29 set in concrete 30. The supporting skirt 27 is formed similarly to the interior support 25 but is of greater vertical height.

Three circular series of aluminum plates 31, 32, and 33 are provided for conducting heat from the plates 5 of the second course of plates to the supporting skirt 27 and three series of plates 34, 35, and 36 are provided for conducting heat from the plates 4 of the first course of plates to the supporting skirt 27.

Considering the series of plates 31, each plate 31 is formed from a flat sheet and comprises a horizontal upper edge part 31A adapted to contact the shell outer surface at a distance from and above the annulus 3, a horizontal lower edge part 31B adapted to contact the outer surface of the skirt 27 at a distance from the annulus 3 and an intermediate part 31C curved convexly away from the annulus 3. Each plate 31 is of the order of four feet long in the horizontal dimension, and is longer at its upper edge part than at its lower edge part, and the series is constituted by a plurality of plates 31 distributed circularly around the pressure vessel axis with adjacent edges contiguous or nearly contiguous. The upper edge parts 31A of the plates are sandwiched between the shell and mild steel strip-like plates 37 through which pressure is applied on the said edge parts to ensure good thermal contact with the shell; the pressure is derived from nuts 38 screwed onto angularly distributed bolts 39, which project radially from the shell through suitable apertures in the plate edge parts 31A and the plates 37 and are welded to the shell at their inner ends. Similar strip-like plates 37, nuts 38 and bolts 39 hold the lower edge parts 31B of the plates 31 to the skirt 27.

The second series of plates 32 is similar to the first series of plates 31 and is similarly secured to the shell and to the skirt 27 but is of less vertical dimensions and is arranged in the space bounded by the shell, the skirt 27, and the first series of plates 31. The third series of plates 33 is again similar to the first series of plates 31 and is similarly secured to the shell and to the skirt 27 but is of still lesser vertical dimensions and is arranged in the space bounded by the shell, the skirt 27, and the second series of plates 32.

The three circular series of aluminum plates 34, 35 and 36 are similar in mode of connection to the shell and to the skirt 27 to the series of plates 31, 32 and 33 but are located to the inner side of the skirt 27. Each plate is of the order of four feet long and is shorter at its upper edge part than at its lower edge part and is, in its intermediate part 34C, 35C or 36C convexly curved away from the annulus 3. The second series of plates 35 is arranged in the space bounded by the shell, the skirt 27 and the first series of plates 34, and the third series of plates 36 is arranged in the space bounded by the shell, the skirt 27 and the second series of plates 35.

In order to reduce the dissipation of heat, the pressure vessel is lagged with conventional heat insulating material (not shown). Thus at the lower part of the pressure vessel, one or more layers of one or more different kinds of heat insulating material are applied to a total thickness indicated by the dotted line 41 over the shell above the level of the plates 31, over the circular series of plates 31 and over the outer surface of the skirt 27 below the level of the plates 31, and to a total thickness indicated by the dotted line 42 over the inner surface of the skirt 27 below the level of the plates 34, over the circular series of plates 34 and over the shell below the level of the plates 34.

It will be appreciated that at the cruciform-section annulus 3, where the weight of the shell is transferred to the skirt 27, and where the weight of the reactor core is transferred through the shell to the supporting skirt 27 large differential expansions between the annulus and the metal parts welded thereto are likely to cause high and complicated stresses. During operation, however, with release of heat within the pressure vessel, the described arrangement of the six series of plates 31 to 36 reduces the magnitudes of temperature differences, and thus differential expansions, in the neighbourhood of the cruciform-section annulus 3. The uppermost end of the support skirt tends to attain a temperature little different from that of the annulus, for lower parts of the support skirt are raised to higher temperatures than otherwise would be the case by virtue of the heat received thereby through the plates 31 to 36, as also by direct and indirect radiation from the shell. The temperature gradient in the whole of the upper part of the support skirt 27 is small. As a result the upper length of the skirt 27 adjacent the annulus 3 will expand or contract substantially to the same extent as the zone of the shell at the annulus and in unison therewith.

Thermal expansions and contractions of the dimensions of the aluminum plates 31 to 36 between parallel edges are readily accommodated by flexing of the curved intermediate parts of the plates.

Referring to FIGURES 4 and 5 of the drawings, a less preferred modification of the arrangement of FIGURES 1 to 3 is illustrated in which for the six series of curved aluminum plates 31 to 36 there are substituted two series, an outer and an inner, of flat mild steel plates, 61 and 62 respectively, spaced from the support skirt 27 at their lower edges. Each plate 61 of the outer series is of the form of a trapezium arranged with the longer edge 61A of its two parallel edges horizontal and adjacent the shell outer surface at a distance from and above the annulus 3 and secured to the shell by a pair of spaced lugs 63 each welded both to the shell and to the plate, and the shorter edge 61B of its two parallel edges adjacent to but spaced from the support skirt 27 at a distance from the annulus 3. The remaining edges 61C of the plate lie in respective vertical planes through the centre of the pressure vessel; the plates 61 are distributed circularly around the pressure vessel axis with the adjacent edges 61C of adjacent plates 61 contiguous or nearly contiguous. The zone of the shell adjacent to and above and outwardly of the uppermost end of the skirt 27, the upper part of the skirt, and the wall formed by the series of plates 61 form boundaries of an annular space 64 of substantially triangular cross-sectional shape.

Correspondingly the inner series of plates 62 assists in defining an annular space 65 of substantially triangular cross-section adjacent the annulus 3 to the inner side of the skirt 27. The plates 62 are distributed contiguously or nearly contiguously circularly around the pressure vessel axis, each being of trapezium form with the shorter edge 62A of its two parallel edges adjacent the shell and the longer edge 62B of its two parallel edges adjacent to but spaced from the skirt 27. Lugs 66 welded both to the shell and to each plate 62 secure the plates in position.

Heat insulating material (not shown) is applied to a total thickness indicated by the dotted line 41 over the shell above the level of the plates 61, over the plates 61 and over the outer surface of the skirt below the level of the plates 61; and to a total thickness indicated by the dotted line 42 over the inner surface of the skirt below the level of the plates 62, over the surfaces of the plates 62 remote from the annulus 3 and over the shell below the level of the plates 62.

During operation, with release of heat within the pressure vessel, the surfaces of the skirt 27 facing the spaces 64 and 65 receive heat raidated directly thereto by the surfaces of the shell facing the said spaces, and receive heat radiated and reflected thereto by the surfaces facing the spaces 64 and 65 of the plates 61 and 62, which themselves receive heat by radiation from the shell. In the inner annular space 65, convection currents in the atmosphere in the said space is likely to convey a certain amount of heat from the adjacent shell wall to the uppermost end of the skirt 27. As a result, the uppermost end of the said skirt tends to obtain a temperature little different from that of the annulus and there is only a small temperature gradient in the whole of the upper part of the skirt and the length of the supporting skirt 27 adjacent the annulus will expand or contract substantially to the same extent as the zone of the shell at the annulus and in unison therewith.

We claim:

1. A vessel adapted to be subjected to elevated temperatures comprising a metallic shell of circular horizontal cross-section having a convexly curved bottom section, a cylindrical metallic skirt of substantially lesser diameter than said shell having its upper end welded to said curved bottom section, and means for minimizing the temperature gradient across said welded connection between said shell and skirt comprising a circular row of flexible metallic plate members depending from said curved bottom section and sloping towards and rigidly connected at their lower ends to said skirt in heat conducting relation with said bottom section and skirt and to define with said skirt and bottom section an annular space of substantially triangular shape across which heat radiated by said bottom section is reflected by said plate members to the upper end portion of said skirt.

2. The invention as defined in claim 1 wherein said flexing means includes a plurality of spaced arcuately shaped plate members, and each of said plate members having their respective end portions securely connected in thermal contact with both said shell and said skirt to provide a conduction path for the transfer of heat between said shell and said skirt, and said spaces defined between said plates forming a path for the radiant transmission of heat therethrough whereby the transmission of heat by radiation and conductance between said skirt and shell co-operate to minimize the temperature gradient across the connection between the shell and skirt.

3. The invention as defined in claim 2 wherein a plurality of said spaced plates are disposed between said shell and skirt on both sides of said skirt.

4. The invention as defined in claim 3 wherein said plates extend about the entire circumference of said skirt.

5. The invention as defined in claim 4 wherein a layer of insulation covers the outer surface and said shell, outermost plate of said plurality of plate, and said skirt.

6. A vessel adapted to be subjected to elevated temperatures comprising a shell for containing a substance at high temperatures, said shell including an annular section cruciform in cross-section and said cruciform annular section having a pair of cross limbs forming a portion of said shell, a limb integrally connected to said cross limb extending into the interior of said shell, and a limb extending exteriorly of said shell, a skirt rigidly connected to exterior limb of said cruciform section to form a support for said shell, an internal support connected to the internal limb, and means connected in thermal connection to both said shell and skirt in the vicinity of said cruciform section to define with said skirt and shell the boundaries of a radiation space whereby said latter means and radiation space formed thereby co-operate for maintaining a relatively low temperature gradient across the connection between said shell and skirt connected thereto.

7. A vessel adapted to be subjected to elevated temperatures comprising a shell for containing a substance at high temperatures, said shell including an annular section cruciform in cross-section and said cruciform annular section having a pair of cross limbs forming a portion of said shell, a limb integrally connected to said cross limb extending into the interior of said shell, and a limb extending exteriorly of said shell, a skirt rigidly connected to exterior limb of said cruciform section to form a support for said shell, an internal support connected to the internal limb, and an arcuately shaped plate having its end portions connected in thermal contact to both said shell and skirt in the vicinity of said cruciform section exteriorly of said shell to define with said skirt and shell the boundaries of a radiation space circumscribing said skirt.

8. A spherical vessel adapted to be subjected to elevated temperatures comprising a shell for containing a substance at high temperatures, said shell being formed of several courses, each course including plurality of convex plates joined in end to end relationship, an annular section cruciform in cross-section interconnecting a pair of said courses, said cruciform annular section having a pair of cross limbs forming a portion of said shell interconnecting with adjacent courses, a limb integrally connected to said cross limb extending into the interior of said shell, and a limb extending exteriorly of said shell, a skirt rigidly connected to exterior limb of said cruciform section to form a support for said shell, an internal support connected to the internal limb, and means rigidly connected to both said shell and skirt in the vicinity of said cruciform section to define with said skirt and shell the boundaries of a radiation space disposed exterior of said shell.

9. A vessel adapted to be subjected to elevated temperatures comprising a metallic shell of circular horizontal cross-section having a convexly curved bottom section, a cylindrical metallic skirt of substantially lesser diameter than said shell having its upper end welded to said curved bottom section, and means for minimizing the temperature gradient across said welded connection between said shell and skirt comprising circular rows of metallic plate members in heat conducting relation with and depending from said curved bottom section at the outer and inner sides of said skirt and sloping towards said skirt to define with said skirt and bottom section outer and inner annular spaces of substantially triangular shape across which heat radiated by said bottom section is reflected by said plate members to the upper end portion of said skirt.

References Cited in the file of this patent

UNITED STATES PATENTS

| | | |
|---|---|---|
| 2,523,274 | Boardman | Sept. 26, 1950 |
| 2,643,022 | Cornell | June 23, 1953 |
| 2,769,563 | Weil | Nov. 6, 1956 |

FOREIGN PATENTS

| | | |
|---|---|---|
| 215,304 | Australia | May 16, 1958 |
| 789,022 | Great Britain | June 15, 1958 |